Figure 1:
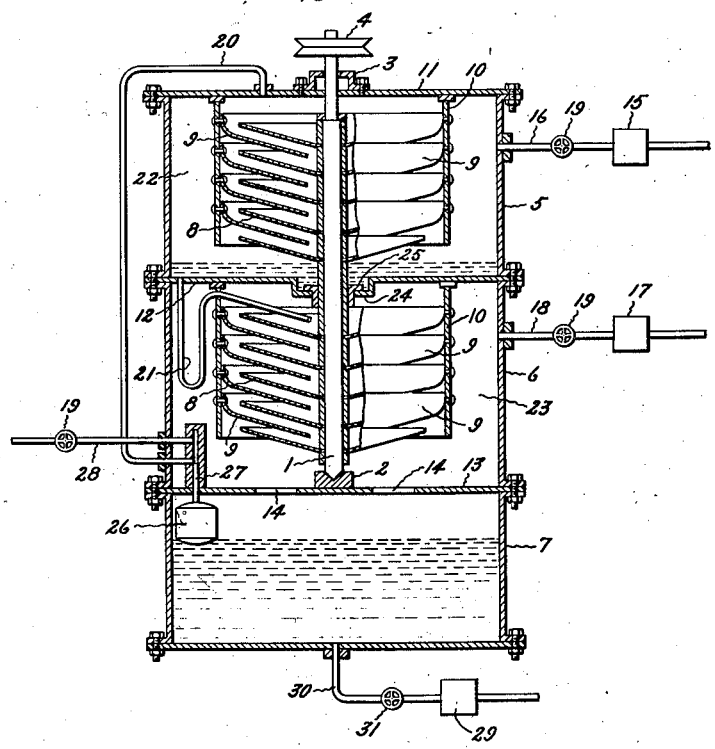

Dec. 15, 1936.  L. EMANUELI  2,064,650

APPARATUS FOR DEGASIFYING LIQUIDS

Filed Oct. 23, 1934

Inventor:
Luigi Emanueli,
by Harry E. Dunham
His Attorney.

Patented Dec. 15, 1936

2,064,650

UNITED STATES PATENT OFFICE 2,064,650

APPARATUS FOR DEGASIFYING LIQUIDS

Luigi Emanueli, Milan, Italy, assignor to Società Italiana Pirelli, a corporation of Italy Application October 23, 1934, Serial No. 749,537
In Italy April 18, 1934

3 Claims. (Cl. 183—2.5)

The present invention relates to apparatus for degasifying liquids, especially oil for use in oil filled cables where the presence of gas and moisture is very detrimental, and has for its object the provision of an improved apparatus of high efficiency for the purpose.

For a consideration of what I believe to be novel and my invention, attention is directed to the accompanying description and the claims appended thereto.

In my improved apparatus, the liquid to be degasified is expanded or spread several times in succession in very thin layers, each having a large surface area, by means of centrifugal force, in a vessel subjected to vacuum and eventual heating. This is conveniently done by means of a series of elements of conical shape having their vertexes at the bottom, said elements being fixed to a rotating shaft and arranged to alternate with a like series of fixed elements also of conical shape, the vertexes of which are open. Th liquid to be degasified is introduced into the center of the first rotatable cone where it is spread outwardly by centrifugal force due to the rotation of the cone. On leaving the first rotating cone, the liquid is caught by the first fixed cone which, being open in the center, conducts it to the center of the adjacent rotating cone, and so on. After these successive operations, the liquid is collected at the bottom of the vessel containing all the conical elements, in which vessel a suitable degree of vacuum is maintained.

The degree of vacuum which can be kept in the vessel is naturally dependent upon the capacity of the pump and on the gaseous content of the liquid to be degasified. In practice, however, when employing normal pumps and the liquids usually to be degasified, for instance oil for oil-filled cables, it is not possible to obtain as high a degree of vacuum as is desired. This fact limits the degree of degasification which can be reached, as it cannot increase beyond a certain limit by increasing the number of cones employed.

With the object of considerably increasing the efficiency of the apparatus, according to the present invention, I subdivide it into two or more sections or stages placed one over the other, though forming only one structure, with all of the rotating cones supported by a single rotating shaft. The sections are intercommunicating as far as the oil is concerned, that is, the oil can pass successively from one section to the next, but they are not intercommunicating as regards the gas which is extracted from the said sections by separate pumps creating successively higher degrees of vacuum.

In order to obtain this communication of the liquid between successive sections, a suitable arrangement of hydraulic tightness, such as a tube or tubes in the form of a U, is used. To prevent communication between the gaseous chambers, the passage of the rotatable axis from one section to the other is made, according to the present invention, by means of a special seal or liquid-tight device, without stuffing box, in which the axis is perfectly free to turn.

Figure 2:
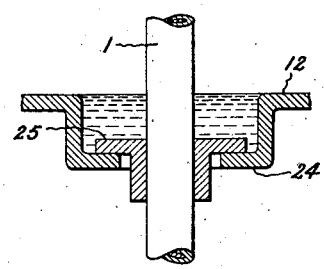

In Fig. 1 of the attached drawing is shown one way of executing the present invention, being formed, for simplicity in drawing, of only two sections, and Fig. 2 is a detail view of shaft sealing means.

The shaft 1 is mounted on a suitable step bearing 2 and has a guide bearing and seal 3 at the upper end. A pulley or other means 4 is used to drive the shaft.

The container or vessel of the apparatus, vacuum-tight, is formed in several parts or sections 5, 6 and 7 fixed one on the other, the lowest of which serves to collect the degasified liquid, while each one of the others contains rotatable cones 8 mounted on the shaft 1 and in alternation with stationary cones 9. The stationary cones in each section are supported at their edges by a cylindrical member 10. The upper member is attached to and supported by the cover 11, and the lower member by the partition 12 between the two sections. The step bearing for the shaft is supported by the partition 13, the latter having suitable openings 14 to permit the liquid to flow into the chamber of the part 7.

Vacuum pump 15 is connected by a pipe 16 to section 5, and vacuum pump 17 by pipe 18 to section 6. The pump 17 creates a higher degree vacuum than the pump 15. Shut-off valves 19 are provided where necessary. Liquid enters the upper section through a pipe 20 and undergoes its first degasification therein. The degasified liquid then flows through one or more U-shaped tubes 21 into section 6, where, due to pump 17, there is a higher degree of vacuum and where it undergoes a more complete degasification. The U-tube 21, which is hydraulically tight, allows liquid to flow from chamber 22 of one section to chamber 23 of the other but does not permit gas to pass from one chamber to the other although they have different degrees of vacuum.

As shown in Fig. 2, the separating wall or partition 12 between the two successive sections has in its center part a cavity with a large opening at its base 24 for the passage of the shaft 1. A collar is slipped over the shaft, which collar has a flange 25 resting on the base 24. The cavity is filled with liquid which has been degasified in the first section or stage of the apparatus. While shaft 1 revolves, the collar 25 is more or less made to rotate with it, so forming with the shaft a sufficiently good seal for the liquid. The passage of the liquid is prevented, however, through the opening in the base 24 by the flange 25, especially during rotation. In this way, the rotatable axis rests only on the step bearing 2 so that a support or intermediate stuffing box is avoided. Nevertheless, the passage of the liquid between the two sections along the axis is almost completely avoided, and the separation between the gaseous chambers of the adjoining sections of the apparatus is also perfect. In other words a hydraulic seal is provided between the chambers of the two sections, and the liquid also serves to lubricate the relatively movable parts. Any gas which may be entrained in any oil which may leak through the seal is extracted by the pump 17.

The degasified liquid collects in the lowest section 7, until the float 26 on being raised automatically by a rise in level of the oil, interrupts, by means of a piston valve 27, the communication between the inlet pipe 28 of the liquid to be degasified and the tube 20 which introduces the liquid into the apparatus. Liquid is supplied to inlet pipe 28 to the apparatus from any suitable source.

The degasified liquid is extracted by a pump 29 through the pipe 30 from the chamber in the casing 7, a shut-off valve 31 being included in the pipe.

What I claim as new and desire to secure by Letters Patent of the United States is:

1. In an apparatus for degasifying liquids, the combination of a vertical casing having top, bottom and side walls, a partition dividing the casing into two separate chambers, a second perforated partition situated between the lower chamber and the bottom wall defining a collection chamber for degasified liquid, a driving shaft supported at its lower end on the second partition and at its upper end by the top wall of the casing, a sealing means for the shaft carried by the first named partition, sets of conical rotors for discharging liquid outwardly by centrifugal force carried by the shaft and located one in each of the chambers, a set of conical stationary elements located in each of the chambers for receiving the liquid discharged by the rotors, each of said elements partly enclosing the rotors, annular members for supporting the sets of stationary elements, one of said members being supported by the top wall of the casing and the other by the partition between the chambers, separate vacuum pumps for the rotor containing chambers, one of which produces a higher degree of vacuum than the other, a conduit for conveying liquid to the upper chamber and delivering it on to a conical rotor located therein, a conduit and pump for removing degasified liquid from the collection chamber, and a conduit registering with an opening in the first named partition for conveying partially degasified liquid from one chamber to another and discharging it on to a conical rotor located therein.

2. In an apparatus for degasifying liquids, the combination of a vertically disposed vessel, a horizontal partition dividing the vessel into two chambers to form stages which operate at different sub-atmospheric pressures, a vertical shaft extending through the partition, bearings therefor, a set of conical rotors located in each chamber and mounted on the shaft and rotated thereby, a set of stationary conical elements located in each of the chambers and extending between pairs of the conical rotors for receiving liquid discharged by centrifugal force from one rotor and conveying it to an adjacent rotor, an annular support common to the stationary elements of each stage located within the chamber thereof and restricting the outward movement of the liquid discharged by the rotors, a vacuum pump connected to one of the chambers for maintaining a determined sub-atmospheric pressure therein, a second pump connected to the other of the chambers for maintaining a determined pressure therein which is lower than that in the first chamber, a conduit of U-shape to form a trap which receives partially degasified liquid from the first chamber and discharging it on to the upper of the conical rotors located within the second chamber, an hydraulic sealing means comprising a collar with an opening through which the shaft loosely extends and which freely rests on the partition to permit of sidewise movement for preventing free passage of liquid around the shaft from the upper to the lower chamber, and conduit means for supplying raw liquid to the rotor of the first chamber.

3. In an apparatus for degasifying liquids, the combination of a vertically disposed vessel, a horizontal partition dividing the vessel into two chambers to form stages which operate at different sub-atmospheric pressures, a vertical shaft extending through the partition, bearings therefor, a set of conical rotors located in each chamber and mounted on the shaft and rotated thereby, a set of stationary conical elements located in each of the chambers and extending between pairs of the conical rotors for receiving liquid discharged by centrifugal force from one rotor and conveying it to an adjacent rotor, an annular support common to the stationary elements of each stage located within the chamber thereof and restricting the outward movement of the liquid discharged by the rotors, a vacuum pump connected to one of the chambers for maintaining a determined sub-atmospheric pressure therein, a second pump connected to the other of the chambers for maintaining a determined pressure therein which is lower than that in the first chamber, a conduit of U-shape to form a trap which receives partially degasified liquid from the first chamber and discharging it on to the upper of the conical rotors located within the second chamber, a hydraulic sealing means for the shaft comprising a recessed portion of the partition and a flanged ring located therein through which the shaft passes without positive connection thereto, a conduit means for supplying raw liquid to the rotor of the first chamber, a float valve responsive to a change of level of the degasified liquid in the chamber at the bottom of the vessel for controlling the passage of raw liquid through the conduit means, and a pump for removing degasified liquid from the last named chamber.

LUIGI EMANUELI.